United States Patent [19]

Phillips, deceased et al.

[11] Patent Number: 4,782,515

[45] Date of Patent: Nov. 1, 1988

[54] DIGITALLY CONTROLLED INTERCOMMUNICATIONS SYSTEM

[76] Inventors: Martin J. Phillips, deceased, late of Chandler, Tex.; by Margaret J. Phillips, executrix, Rte. 1, Box 23B-0, Chandler, Tex. 75758

[21] Appl. No.: 928,169

[22] Filed: Nov. 7, 1986

[51] Int. Cl.[4] .............................................. H04M 9/02
[52] U.S. Cl. .................................... 379/172; 379/173
[58] Field of Search ............... 379/167, 168, 169, 170, 379/171, 172, 173, 159, 160, 161

[56] References Cited

U.S. PATENT DOCUMENTS

| | | | |
|---|---|---|---|
| 4,158,112 | 6/1979 | Cerbone et al. | 379/159 |
| 4,308,427 | 12/1981 | Danford | 379/113 |
| 4,401,847 | 8/1983 | Schneider et al. | 379/172 X |
| 4,638,124 | 1/1987 | Hargrave et al. | 379/159 |

Primary Examiner—Keith E. George
Attorney, Agent, or Firm—Kanz, Scherback & Timmons

[57] ABSTRACT

An intercommunications system for the selective establishment of two-way communications between a multiplicity of stations is disclosed and comprises a terminal located at each station and a communications network including a predetermined number of lines for interconnecting any one of the terminals to at least one other of the terminals. Each terminal comprises an audio subsystem, apparatus for generating digitally coded control words for selecting a particular terminal and for selecting a particular unused line to be used in the two way communications, apparatus for transmitting the control words over a selected line to all the terminals, apparatus for receiving the digitally coded control words, decoding the control words and operatively connecting the desired terminals to the selected line, a monitor enable device for listening to the communications on a particular line without being part of the communications and display devices which show which lines and which terminals in the intercommunications system are in use.

20 Claims, 11 Drawing Sheets

DIGITALLY CONTROLLED INTERCOMMUNICATIONS SYSTEM

BACKGROUND OF THE INVENTION

1. Field of the Invention

The present invention relates in general to intercommunications or intercom systems, and more particularly, to a new and improved digitally controlled intercom system.

2. Description of the Prior Art

Numerous loudspeaker intercom arrangements have been employed in communication systems. The earlier systems comprised paging arrangements which provided unidirectional communication so that one station user could signal another through a loudspeaker in the called station's equipment.

Later systems provided two unidirectional communication paths between stations equipped with loudspeaker and microphone facilities to enable two-way communications. However, many prior art loudspeaker communication systems have been plagued by the necessity of requiring the subscriber at the called station to initially activate the loudspeaker and microphone arrangement in the station's equipment in order to answer an intercom call.

The present invention as claimed is intended to provide apparatus which eliminates many of the prior art deficiencies associated with intercommunication systems which include the need to interconnect the many stations with a large multi-pair (conductors) cable. Many of the prior art systems are limited in the manner of signaling the called station or terminal. Many of the prior art systems require extension station selection facilities and expensive voice switching circuitry.

SUMMARY OF THE INVENTION

The present invention provides an intercommunications system for the selective establishment of two-way communications between a multiplicity of stations which each have a terminal. The system is a multi-channel, all master intercommunications system which employs digital selection of and control over the system. The system provides an all master access between any of the terminals. The system provides for both aural and visual signaling at the called terminal. Small loudspeakers are used as combination speaker/microphones. The intercommunications system comprises a predetermined number of lines or leads for interconnecting the terminals at the stations. Each of the terminals comprise an audio subsystem which includes squelch apparatus capable of disabling a portion of the audio subsystem and slave enable apparatus capable of configuring the terminal to a slave condition such that communications may be carried out in a "hands off" mode of operation by the party at the called terminal. Also included in each terminal are means for generating coded address information which is a digital signal which is capable of being recognized by a particular one of the terminals. Each terminal includes means for decoding the coded address information when received and also logic means for providing a signal to the audio subsystem to place the terminal in a "hands off" mode of operation. The party at the calling terminal manipulates a "push-to-talk" switch to control the communication with the party at the called terminal.

Among the advantages offered by the present invention is a system of relatively low cost, high quality audio communication and high reliability. All terminals are masters and can call any other terminal. The party at the called terminal can communicate with the calling party in a "hands off" mode of operation. Each terminal provides an indication of which terminals or lines are busy. Any terminal can join an ongoing audio communication. Provision is made for monitoring the network without joining the conversation.

Examples of the more important features and advantages of this invention have thus been summarized rather broadly in order that the detailed description thereof that follows may be better understood and in order that the contribution to the art may be better appreciated. There are, of course, additional features of the invention that will be described hereinafter and which will also form the subject of the claims appended hereto.

Other features of the present invention will become apparent with reference to the following detailed description of a presently preferred embodiment thereof in connection with the accompanying drawing in which:

BRIEF DESCRIPTION OF THE DRAWING

FIG. 7 is a simplified schematic circuit diagram of the tone generator means of the present invention;

DESCRIPTION OF THE PREFERRED EMBODIMENT

Figure 1:
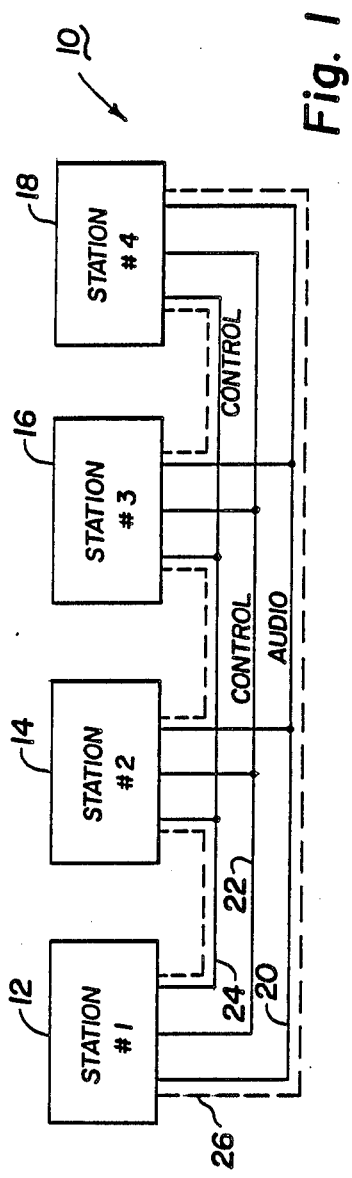
FIG. 1 illustrates one embodiment of the present invention in functional block diagram form.

Referring now to the drawing wherein like reference numerals designate like or corresponding elements throughout the several views, the digitally controlled intercommunications system or intercom system is referred to generally by reference numeral 10. With reference to FIG. 1, the digitally controlled intercommunications system or intercom system 10 comprises (in one embodiment) four stations or channels 12–18 which are operatively connected together by a parallel network of three conductors or leads 20–24 and a shield (return) 26 which may be routed in the most convenient manner between stations or channels 12-18 so as to employ the shortest and most direct cable path. Conductors or leads 20-24 provide a path for audio, station signaling and network configuration control. Conductors or leads 22 and 24 direct the digital control or address information signals between stations or channels 12-18 while conductor or lead 20 directs the audio signals or intelligence between stations or channels 12-18.

Figure 2:
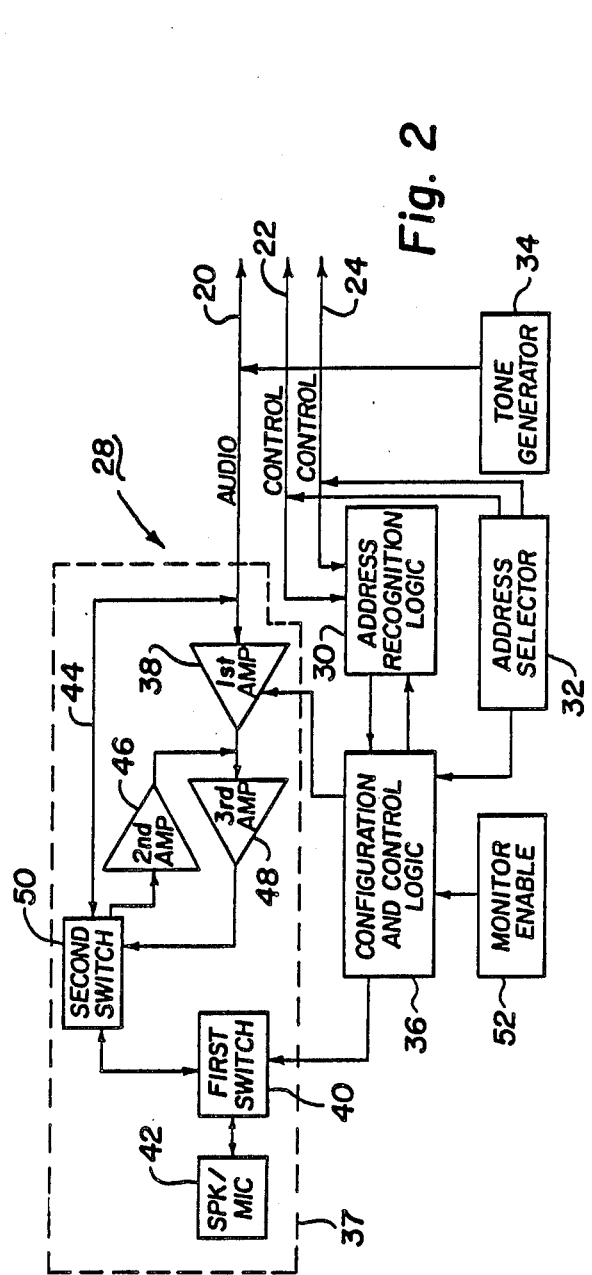
FIG. 2 is a simplified block diagram of the present invention for one station or terminal.

With reference to FIG. 2, terminal 28 is disclosed in a simplified block diagram form. Each station or channel includes a basic terminal which differs from each other only in the address recognition logic 30 which is configured to recognize the digital address information for that particular station. Each station may operate as a master to call any other station. A party or operator at any of the stations or channels 12-18 may, by the use of his terminal, initiate a call to any one of the other terminals or stations by selecting the desired station at the address selector 32 which results in the application of a DC voltage (address information) being applied on leads 22 and 24 from address selector 32. The address information is presented as a two bit binary logic code (at T.T.L. levels) by zero (a "0" signal or bit) or one (a "1" signal or bit). The following is a code truth table representative of the address information conveyed:

| Lead | | Enables Terminal |
| --- | --- | --- |
| 22 | 24 | at Station # |
| 1 | 1 | 1 |
| 0 | 1 | 2 |
| 1 | 0 | 3 |
| 0 | 0 | 4 |

With further reference to FIG. 2 and for explanation purposes, it will be assumed that a terminal 28 is located at a station (e.g. #3) which is going to call another of the stations (e.g. #4) which also includes a terminal 28 which differs only in a portion of the address recognition logic 30. The calling party will select at the address selector 32 the particular station (#4) to be called by activating the correct control button or switch and the correct digital address information from the address selector 32 will be presented to the terminals at all the stations on leads 22 and 24. The address selector 32, through the configuration and control logic 36 (at the calling station #3), will provide a signal to enable first amplifier 38 and remove the squelch condition at the calling station, In the preferred embodiment, first amplifier 38 comprises a line amplifier operatively coupled to a squelch amplifier. The address recognition logic 30 at the called station (#4) will respond to the digital address information and provide an output to the configuration and control logic 36 at the called station (#4). The configuration and control logic 36 configures the terminal in the called station (#4) to the "slave condition" by providing an output to first amplifier 38 to maintain same in a squelch condition and by providing an output to first switch means 40 to connect the speaker/microphone 42 to lead 20 via lead 44 and second switch means 50. A light associated with the address recognition logic 30 at the stations (#1 and #2) not called will be turned on to indicate that a station is calling station #4. Also, lights associated with the address recognition logic 30 at the calling station (#3) and the called station #4 will be turned on to indicate that station #4 has been called.

The calling party may also momentarily activate tone generator means 34 to provide an audio tone to the called station (#4) to alert the party at the called station (#4) that another station is calling them. A light associated with the address recognition logic 30, at the called station (#4), flashes off and on when audio frequencies are present on lead 20 whether the audio comprises that from the tone generator means 34 or from voice communications between the calling station and the called station.

The party at the called station, thus being alerted that another station is calling, need not take any action other than to verbally answer the call in a "hands off" condition while carrying on a normal conversation with the calling party. At the called station (#4), the audio from the calling station (#3) arrives at the speaker/microphone 42 via leads 20 and 44, second switch means 50 and first switch means 40. The audio from the called station (#4) to the calling station (#3) travels the reverse path.

To establish two-way communications between the calling station (#3) and the called station (#4), the calling party activates the second switch means 50 on his terminal 28 to talk to the called party. With the second switch means 50 activated to the talk position, the voice communications from the calling party goes from the speaker/microphone 42 through first switch means 40 through second switch means 50 to second amplifier 46 to third amplifier 48 and then through second switch means 50 to lead 44 and on to lead 20 to the called station. In the preferred embodiment, second amplifier 46 comprises a microphone preamplifier and third amplifier 48 comprises an audio frequency power amplifier. Second switch means 50, when activated to the talk position, also provides an output to place first amplifier 38 in the squelch mode and disabling same. In the preferred embodiment, second switch means 50 comprises a push-to-talk switch with a plurality of sections. To listen to the voice communications from the called station or party, the calling station or party releases the second switch means 50 from the talk position to the listen position whereupon first amplifier 38 is enabled and the audio or voice communications from the called party enters the terminal on lead 20, goes through first amplifier 38, then through third amplifier 48 and second switch means 50 and then through first switch means 40 and on to speaker/microphone 42.

Network discipline will permit the use of the system for exclusive terminal-to-terminal use, however any other station may aurally monitor the circuit by depressing the switch or button on the monitor enable 52 which enables first amplifier 38 and allows that other station to monitor the conversation between the calling station and the called station.

If any other station desires to join a conversation in progress between the calling station and the called station, the party at the other station may do so by activating, at the address selector 32, the correct control button or switch for the called station. Then the party at the other station will operate the second switch 50 between the "transmit or talk" and "listen" positions depending upon his decision to talk or listen.

Figure 3:
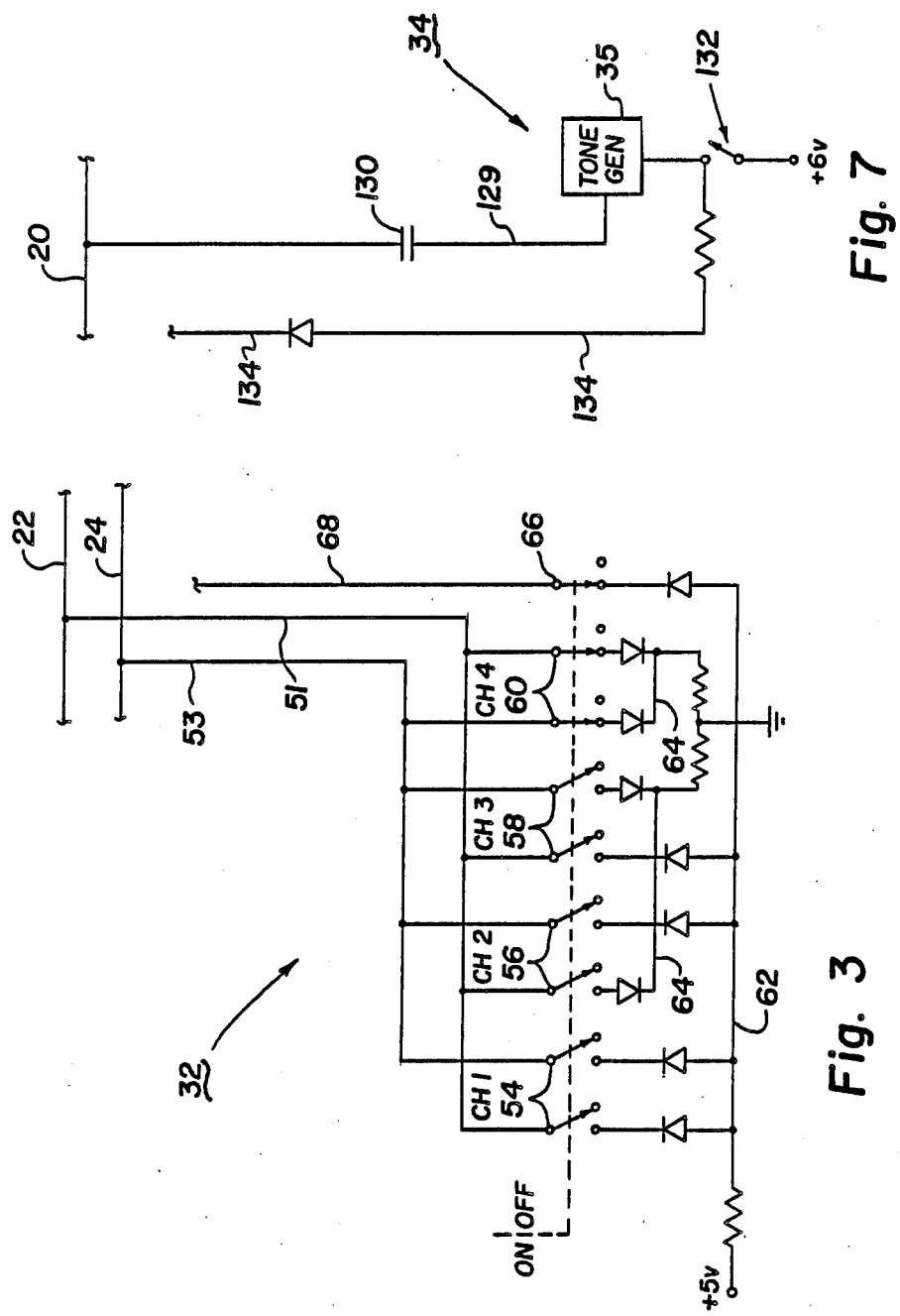
FIG. 3 is a simplified schematic circuit diagram of the address selector of the present invention.

An overview of FIGS. 3-8 will be given first, followed by a detailed operation disclosure. FIG. 3 illustrates in detail the circuit construction of the preferred embodiment of the address selector 32 which is the same for all stations or channels. With reference to FIG. 3, means for applying address information to leads 22 and 24 via leads 51 and 53 include station or channel selector switches 54-60 operatively connected to leads 62 (logic level one) and 64 (logic level zero) for applying the desired address information as set forth in the code truth table above. Third switch means 66 is mechanically coupled to station or channel selector switches 54-60 such that third switch means 66 is placed in the "on" position whenever any of switches 54-60 are placed in the "on" position. When in the "on" position, switch 66 places a logic level one from lead 62 to lead 68 which is operatively connected to the anode of diode 70 in FIG. 5.

Figure 4:
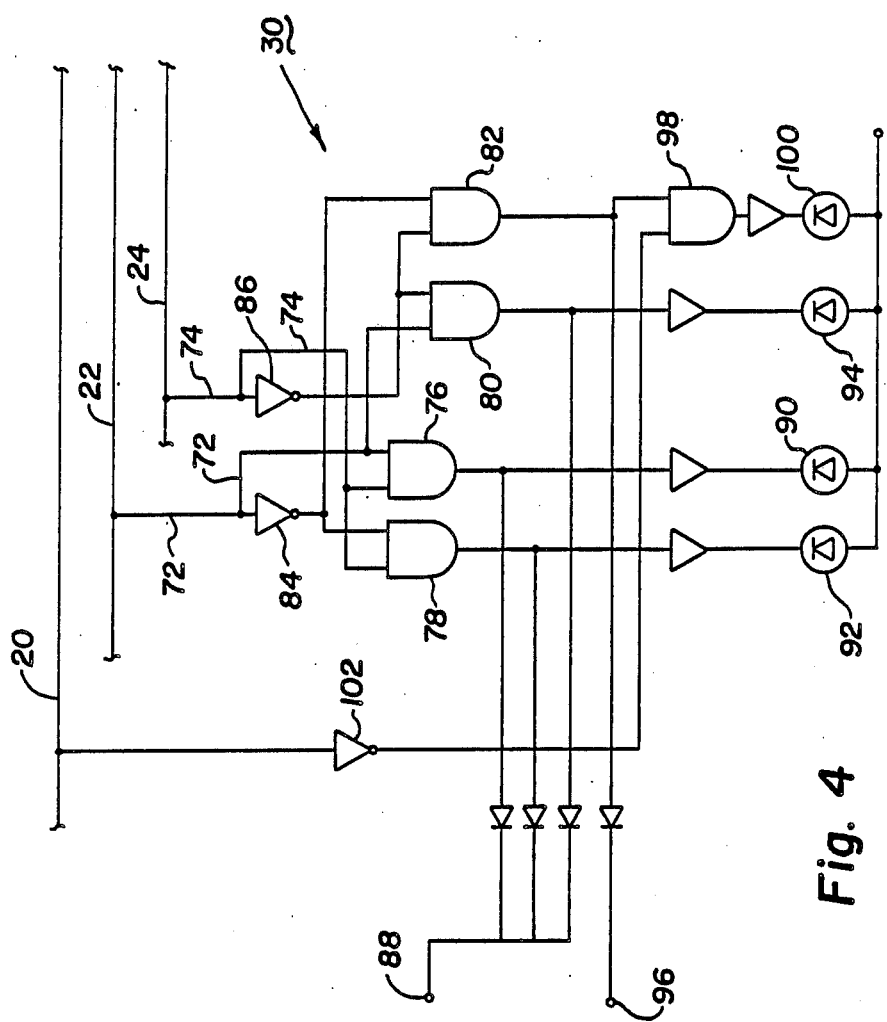
FIG. 4 is a simplified schematic circuit diagram of the address recognition logic of the present invention.

FIG. 4 illustrates in detail the circuit construction of the preferred embodiment of the address recognition logic 30 which is different for each station or channel. With reference to FIG. 4, which is configured for station #4, the address information (the "1" and "0" signals or bits) is input to leads 72 and 74 from leads 22 and 24. The address information is then input to channel or station #1-#4 AND gates 76-82, respectively, via leads 72 and 74 and first and second inverters 84 and 86. The outputs of channel or station #1-#3 AND gates 76-80 are input to configuration and control logic 36 on lead 88 via appropriate diodes and are also input to channel #1-#3 busy indicator lights 90-94 via appropriate amplifiers. The channel #4 section is different from the other three channel sections and the output of channel or station #4 AND gate 82 is input to the configuration and control logic 36 on lead 96 via an appropriate diode and to one input of AND gate 98 whose output is input to channel #4 busy indicator light 100 via an appropriate amplifier. The other input to AND gate 98 is provided from audio lead 20 via inverter 102 and appropriate leads.

Figure 5:
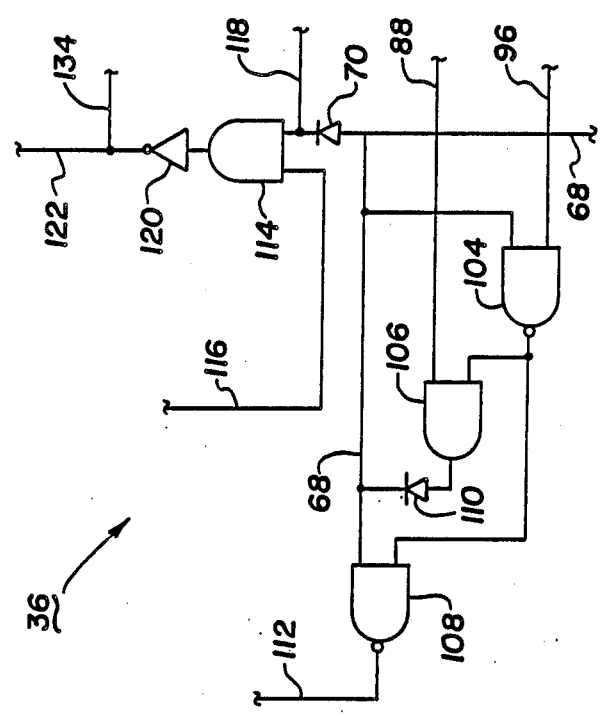
FIG. 5 is a simplified schematic circuit diagram of the configuration and control logic of the present invention.

FIG. 5 illustrates in detail the circuit construction of the preferred embodiment of the configuration and control logic 36 which is the same for all stations or channels. The signal information on lead 96 from the address recognition logic 30 is provided as one input to NAND gate 104 while the other input is provided on lead 68 from third switch means 66 in the address selector 32. The output of NAND gate 104 is provided as one input to AND gate 106 and also as one input to NAND gate 108. The other or second input to AND gate 106 is provided on lead 88 from the address recognition logic 30. The other or second input to NAND gate 108 is provided on lead 68 from third switch means 66 in the address selector 32. The output from AND gate 106 is input through isolation diode 110 to lead 68 and also as part of the other or second input to NAND gate 108. The output of NAND gate 108 is provided to first switch means 40 via lead 112. One input to AND gate 114 is provided from second switch means 50 on lead 116. The other input is provided on lead 118 from monitor enable 52 and on lead 68 through isolation diode 70. The output of AND gate 114 is provided to first amplifier 38 via inverter 120 and lead 122. The output of tone generator means 34 is also applied to lead 122 via lead 134.

Figure 6:
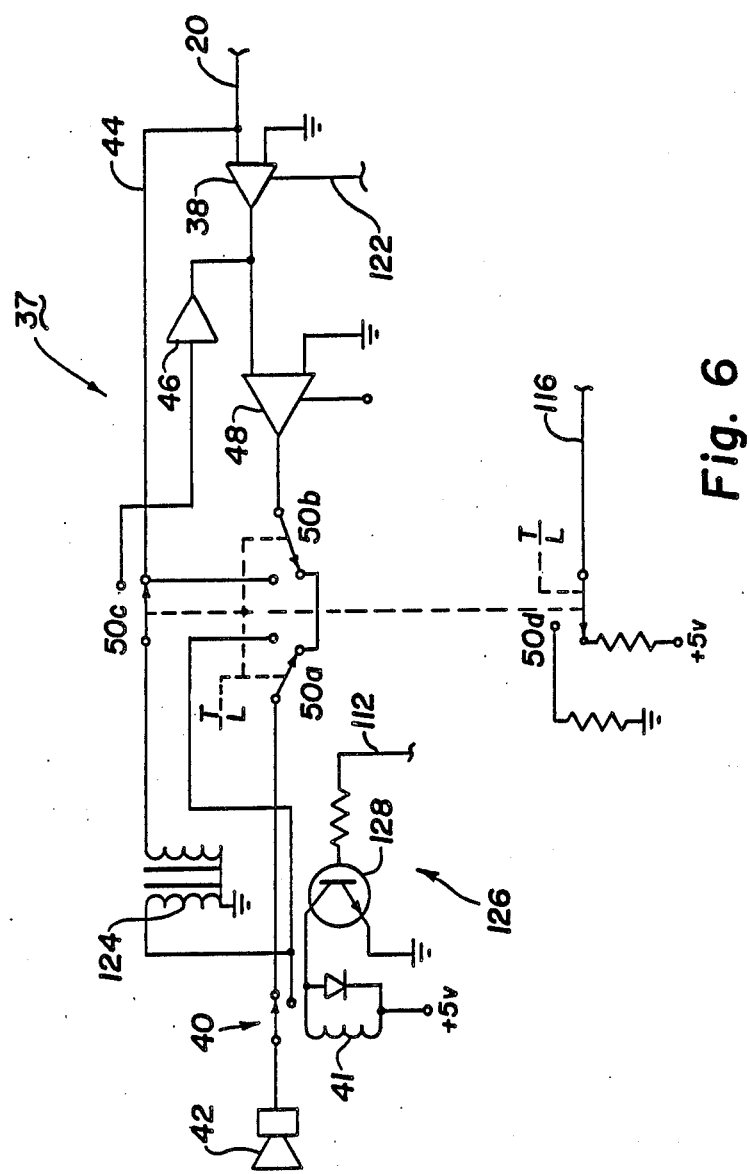
FIG. 6 is a simplified schematic circuit diagram of the audio subsystem of the present invention.

FIG. 6 illustrates in detail the circuit construction of the preferred embodiment of the audio subsystem 37 of the present invention which is the same for all stations or channels. Audio lead 20 delivers the incoming audio signals to first amplifier 38 and to section 50c of second switch means 50 via lead 44. Section 50c of second switch means 50 is operatively connected to first switch means 40 by line matching transformer 124. Slave enable means 126 (for slave condition) comprises transistor 128 which is operatively connected between lead 112 and relay 41 of first switch means 40. It will be appreciated that second switch means 50 is a four section (50a-50d) push-to-talk switch which is normally in the listen position. The output of first amplifier 38 is input to third amplifier 48 whose output is input to speaker/microphone 42 via sections 50a and 50b of second switch means 50 and first switch means 40. The output of third amplifier 48 is connected to lead 44 through section 50b of second switch means 50 when second switch means 50 is in the T or talk position. The input of second amplifier 46 is connected to line matching transformer 124 through section 50c of second switch means 50 when second switch means 50 is in the T or talk position. Section 50d places a "1" signal or bit on lead 116 to AND gate 114 of configuration and control logic 36 (FIG. 5) when second switch means 50 is in the L or listen position. Section 50d places a "0" signal or bit on lead 116 when second switch means 50 is in the T or talk position.

FIG. 7 illustrates in detail the circuit construction of the preferred embodiment of the tone generator means 34 which is the same for all stations or channels. Tone generator 35 is operatively connected to audio lead 20 by lead 129 and capacitor 130 and to plus six volts by fourth switch means 132 which in the preferred embodiment is a momentary switch which is normally open. Fourth switch means 132, when in the "on" position, also applies a "1" signal to lead 122 (which is an input to first amplifier 38) via lead 134 which "1" signal mutes or disables first amplifier 38. Tone generator 35 is an off-the-shelf chip.

Figure 8:
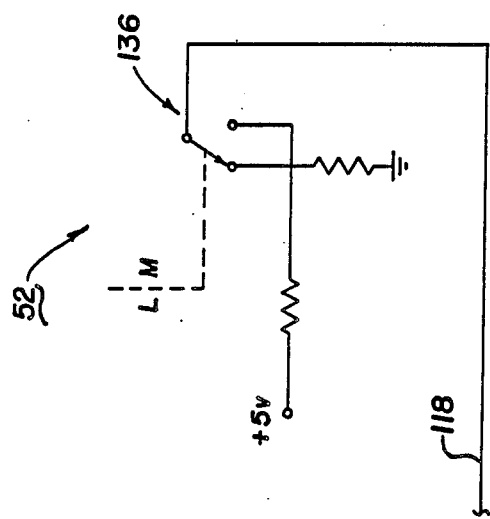
FIG. 8 is a simplified schematic circuit diagram of the monitor enable of the present invention.

FIG. 8 illustrates in detail the circuit construction of the preferred embodiment of the monitor enable 52 which is the same for all stations or channels. Monitor enable 52 comprises fifth switch means 136 which is operable, through appropriate resistors, to place either a "1" signal or a "0" signal on lead 118 which is then input to AND gate 114 of configuration and control logic 36. In the preferred embodiment, fifth switch means 136 comprises a momentary switch which normally applies a "0" signal or bit to lead 118.

The operation of one embodiment of the present invention will be explained with reference to FIGS. 3-8 and with station (#3) 16 being the calling station and station (#4) 18 being the called station. With reference to FIG. 3, the calling party at station #3 will place the channel selector switch 60 (channel #4) of the address selector 32 in the "on" position which also places third switch means 66 in the "on" position. At station #3, channel selector switch 60 places "0" signals or bits on digital control leads 22 and 24 (via leads 51 and 53) which are transmitted to all the stations or channels (including station #3). At station #3, third switch means 66 places a "1" signal or bit as one input to AND gate 114 via lead 68 and diode 70 in the configuration and control logic 36 in FIG. 5. A "1" signal or bit is also provided to the other input of AND gate 114 from section 50d of second switch means 50 in FIG. 6 when second switch means 50 is in the listen position (where it is presently positioned). AND gate 114 is enabled and provides an output of a "1" signal or bit to inverter 120 which provides a "0" signal or bit on lead 122 to first amplifier 38 in FIG. 6 causing first amplifier 38 to be enabled.

With reference to FIG. 4, the "0" signals or bits of address information are provided from address selector 32 of the calling station (#3) to the address recognition logic 30 of the called station (#4) via leads 22 and 24 to leads 72, 74 and inverters 84, 86 which results in a "0" and a "1" signal being applied to the inputs of AND gates 78 and 80, a "0" signal being applied to both inputs of AND gate 76 and a "1" signal being applied to both inputs of AND gate 82 which enables AND gate 82 and applies a "1" signal or bit to one input of AND gate 98 and to lead 96 which provides one input to NAND gate 104 in the configuration and control logic 36 in FIG. 5. The outputs of AND gates 76–80 provide a "0" signal or bit to lead 88 which provides one input to AND gate 106 in the configuration and control logic 36 at the called station #4. Any audio signal on lead 20 will be coupled to AND gate 98 by inverter 102 and cause channel #4 busy indicator light 100 to blink or pulse accordingly. Channel #1–#3 busy indicator lights 90–94 do not light.

As was previously mentioned, the address recognition logic 30 is different for each station or channel. The difference being the location of AND gate 98 and the connections to leads 88 and 96. In station #3, for example, AND gate 98 would be connected between AND gate 80 and channel #3 busy indicator light 94 with lead 96 now being connected to the output of AND gate 80 (which also now provides one input to AND gate 98). The output of AND gate 82 would now be connected to lead 88 and to channel #4 busy indicator light 100. In station #2, for example, AND gate 98 would be connected between AND gate 78 and channel #2 busy indicator light 92 with lead 96 now being connected to the output of AND gate 78 (which also now provides one input to AND gate 98. The output of AND gate 80 would be connected as shown in FIG. 4 and the output of AND gate 82 would be connected as discussed above for station #3.

With reference to FIG. 5, in the called station #4, the "1" signal or bit on lead 96 is provided as one input to NAND gate 104 which also receives a "0" signal or bit as the other input from lead 68 (which has received the "0" signal or bit from third switch means 66 of address selector 32). The "1" signal or bit output from NAND gate 104 is provided as one input to AND gate 106. The other input to AND gate 106 is a "0" signal or bit from lead 88. The "0" signal or bit from lead 68 is provided as one input to NAND gate 108 whose other input is "1" signal or bit from NAND gate 104. The "1" signal or bit output from NAND gate 108 is input to transistor 128 via lead 112.

With reference to FIG. 6, in the called station #4, transistor 128 is turned on by the "1" signal or bit output from NAND gate 108 and activates first switch means 40 to the down position to connect speaker/microphone 42 to lead 20 via line matching transformer 124, section 50c of second switch means 50 and lead 44. This places the called station #4 in the slave condition or mode.

If the party at calling station #3 wishes to alert the party at the called station #4 that someone wishes to converse with him and does not wish to rely on the channel #4 busy indicator light 100 to notify the party, the party at the calling station #3 may operate fourth switch means 132 (FIG. 7) which will activate tone generator 35 and cause an audio tone to be placed on lead 20 via capacitor 130.

In order for the calling station #3 to transmit audio information to the called station #4 it is necessary for the party at calling station #3 to operate the second switch means 50 (FIG. 6) to the T or talk position from the L or listen position. Audio from the party at calling station #3 then travels from speaker/microphone 42 through first switch means 40, section 50a of second switch means 50, line matching transformer 124, section 50c of second switch means 50, second amplifier 46, third amplifier 48, section 50b of second switch means 50 and lead 44 to lead 20 and then to all the other stations or channels. Upon arrival at the called station #4 where the second switch means 50 is in the L or listen position, the audio travels from lead 20 to lead 44, section 50c of second switch means 50, line matching transformer 124, first switch means 40 and speaker/microphone 42.

In order for the party at the called station #4 to respond to the calling station #3, it is only necessary for the party to talk as there is not any need to operate the second switch means 50. Audio from the party at the called station #4 travels the same path (in reverse) at the called station #4 as the audio which was received from the calling station. In order for the calling station #3 to receive audio from the called station #4, second switch means 50 must be released and allowed to return to the L or listen position. The audio received at the calling station #3 will travel from lead 20 to first amplifier 38, third amplifier 48, sections 50b and 50a of second switch means 50 and first switch means 40 to speaker/microphone 42.

If a party at either station #1 or #2 wishes to monitor or listen to the audio transmissions, that party need only to place fifth switch means 136 (FIG. 8) to the "on" position which places a "1" signal or bit on lead 118. This results in first amplifier 38 being enabled then allows the audio on lead 20 to drive speaker/microphone 42 via first amplifier 38, third amplifier 48, sections 50b and 50a of second switch means 50 and first switch means 40.

If a party at either station #1 or #2 wishes to actively join the conversation between the parties at stations #3 and #4, that party need only to activate the station or channel selector switch 60 (channel #4) of the address selector 32 to the "on" position. This also places third switch means 66 in the "on" position which results in first amplifier 38 being enabled. This places the joining station (either #1 or #2) in the same configuration as calling station #3 and the party at the joining station will talk or listen as dictated by the position of second switch means 50 at the joining station (similar to the party at the calling station #3).

Figure 9:
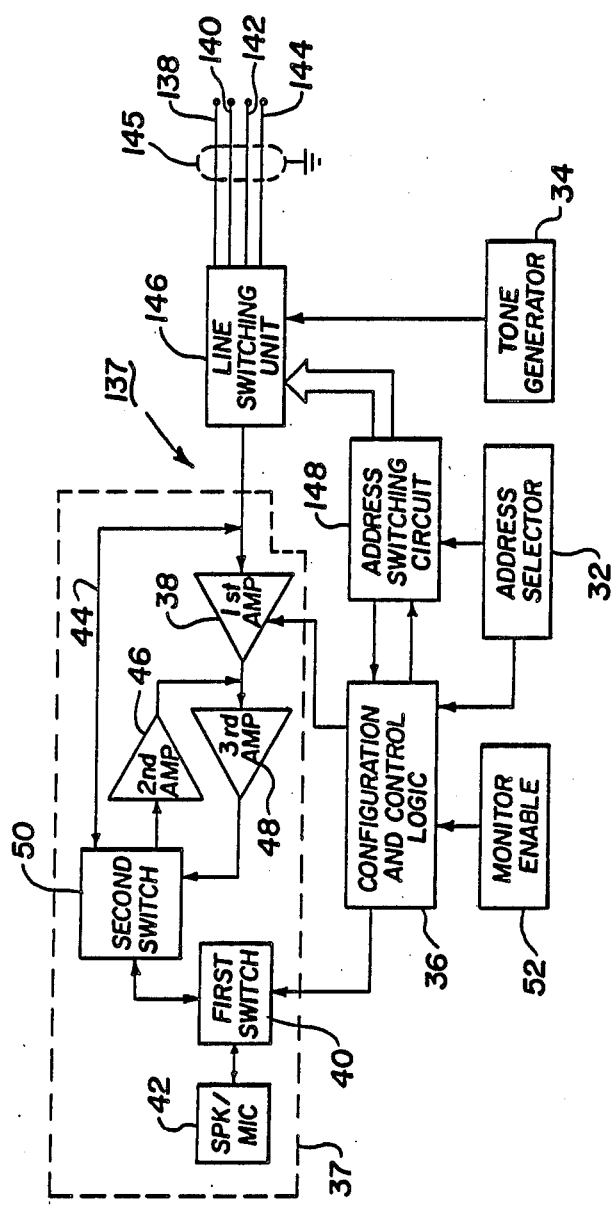
FIG. 9 illustrates a second embodiment of the present invention in functional block diagram form.

The intercom system may be employed in larger networks by the implementation of a slightly modified version of the terminals at each of the stations. With reference to FIG. 9, a further embodiment is disclosed in functional block diagram form of terminal 137 for an eight to ten channel system which employs a single four lead or conductor cable (plus a shield). The primary differences between this embodiment and that disclosed previously (FIG. 2) include the four leads or conductors 138–144 and shield 145, the line switching unit (multiplexer/demultiplexer) 146 and an address logic switching circuit 148. The digital control or address information is transmitted between stations or channels on lead 144 in serial format. Leads 138–142 provide the means for three simultaneous and independent conversations being carried out by terminals on the network. Line switching unit (multiplexer/demultiplexer) 146 provides for "sub-channel" routing of the audio intelligence between network terminals to allow for the three channel simultaneous operation without interference between adjacent channels. As in the previous embodiment, the network configuration control (digital control or address information) and intelligence audio are routed to all terminals or stations through the parallel routing of the interconnecting leads or lines 138-144. In this embodiment, control is accomplished in a similar manner, i.e. the discreet address of a terminal is sent out on the control lead 144 to the network. Control is generated by the address logic switching circuit 148 employing a four digit binary code sent out by and through the line switching unit (multiplexer/demultiplexer) 146 as serial data. All terminals or stations monitor the control lead 144 continuously and upon receipt of their discreet address will switch the audio through the appropriate lead or line to their loudspeaker/microphone 42 in a slave or "hands off" configuration. Functional operation of the terminals is the same as that previously described for the four station or terminal system.

The number of network terminals is only limited by the address binary code and number of audio trunks or leads employed. Following is a table of address codes for a ten station or channel system:

| Binary Code Digits | | | | Terminal |
|---|---|---|---|---|
| 8 | 4 | 2 | 1 | Addressed |
| 0 | 0 | 0 | 1 | Station #1 |
| 0 | 0 | 1 | 0 | Station #2 |
| 0 | 0 | 1 | 1 | Station #3 |
| 0 | 1 | 0 | 0 | Station #4 |
| 0 | 1 | 0 | 1 | Station #5 |
| 0 | 1 | 1 | 0 | Station #6 |
| 0 | 1 | 1 | 1 | Station #7 |
| 1 | 0 | 0 | 0 | Station #8 |
| 1 | 0 | 0 | 1 | Station #9 |
| 1 | 0 | 1 | 0 | Station #10 |

Audio trunk or lead selection is accomplished by the calling party at the calling terminal who (through use of a push-button in addition to the station selector) observes the trunk or lead status lamps (illuminated simultaneously at all terminals to indicate which trunks and stations are in use) and selects an unused audio trunk or lead and addresses a specific distant terminal or station. Any terminal or station may monitor a busy trunk or lead by activating the appropriate trunk or lead selector switch button. Also, any terminal or station may join an existing conversation by selecting the previously called terminal and manipulating his "push-to-talk" switch.

Networks employing more than ten stations may be augmented with additional circuitry, selector switches and trunk conductors to permit use of more digit control codes and shared use of multiple trunks.

Figure 10:
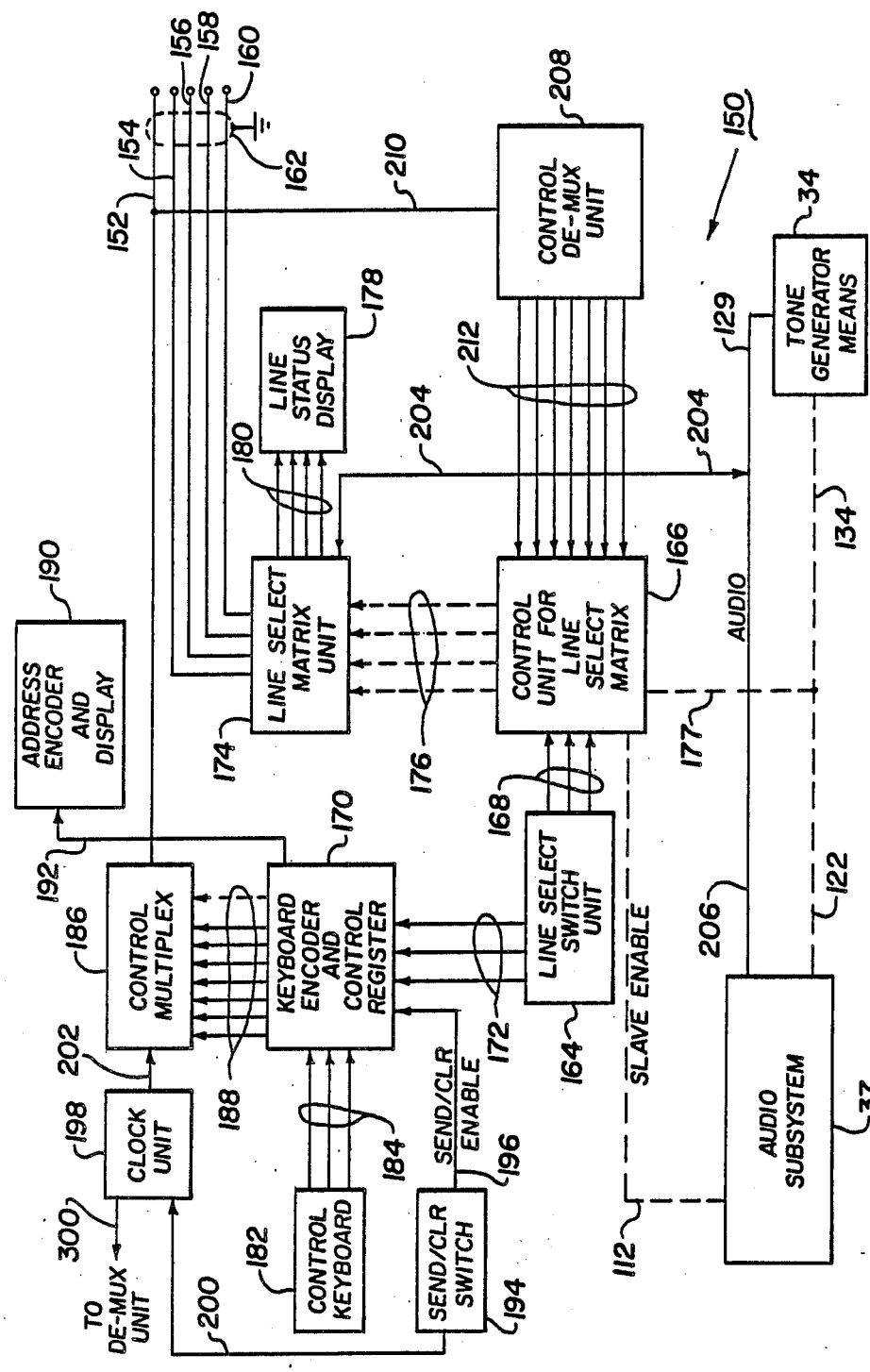
FIG. 10 illustrates a third embodiment of the present invention in functional block diagram form.

With reference to FIG. 10, a further embodiment is disclosed in functional block diagram form of terminal 150 for use in a fifteen station or channel digital intercommunications system. All network or station terminals are interconnected in parallel by a five wire inter-station trunk line comprising lines or leads 152-160 plus shield 162. Each station terminal 150 operates as a master with the capability to access any of the other stations or terminals through any of four audio lines or leads 154-160 in the inter-station trunk line. The terminals 150 are the same at all the stations.

Line or lead 152 is employed among the terminals or stations for the routing of the control data or information word (digital control or address information) in the form of a seven bit (BCD) data word transmitted in serial format at T.T.L. levels from a calling station to a called station. The control data or information word contains a four bit discrete address and a three bit line selection code which permits the configuration of the called station to hear and respond to the party at the calling station in a "hands off" or "slave" operation. This control data or information word configures the called station to receive voice intelligence over any of the four inter-station trunk lines or leads (154-160).

To establish a voice circuit for voice communications between two terminals, the party at the calling station (e.g. #4) initiates the action by selecting an unused audio line in the inter-station trunk line at the line select switch unit 164 by activation of the appropriate switch for that selected line. The output of the line select switch unit 164 is sent to the control unit for line select matrix 166 via first connecting means 168 and to the keyboard encoder and control register 170 via second connecting means 172. The control unit for line select matrix 166 provides a line select enable signal to the line select matrix unit 174 via third connecting means 176 and the correct signal, via lead 177, to the audio subsystem 37 to enable first amplifier 38. Inter-station audio lines which are busy are displayed on the line status display 178 which receives, via fourth connecting means 180, status inputs from the line select matrix unit 174. The party at the calling station #4 then selects the desired station to call (e.g. called station #5) by manipulating the control keyboard 182 for called station #5 (0101) of the possible fifteen discrete addresses. The address selected at the control keyboard 182 is sent to the keyboard encoder and control register 170 via fifth connecting means 184. The keyboard encoder and control register 170 provides appropriate signals to control multiplex 186 via sixth connecting means 188 and to address encoder and display 190 via seventh connecting means 192 where the selected called station number (05) is displayed. The party at the calling station #4 initiates the transmission of the control data or information word (digital control or address information) from the control multiplex 186 to all the stations or terminals via lead 152 by momentarily closing the send/clear switch 194. The closure signal from the send/clear switch 194 is sent to the keyboard encoder and control register 170 via eighth connecting means 196 and to the clock unit 198 via ninth connecting means 200. The closure signal to the keyboard encoder and control register 170 enables the keyboard encoder and control register 170 to effect a parallel transfer of the control data or information word (digital control or address information) to the control multiplex 186. The closure signal to the clock unit 198 enables the clock unit 198 to transmit the appropriate signals to the control multiplex 186 via tenth connecting means 202 thereby causing the control multiplex 186 to transmit (three times) the control data or information word (digital control or address information—the seven bit station address data and the line select data) to the stations or terminals.

The party at the calling station #4 has the option of signaling the party at the called station #5 that another station is calling them by momentarily activating the tone generator means 34 and sending an audio tone to the called station #5 via lead 129, lead 204 to the line select matrix unit 174 and then over the selected audio lead from the line select matrix unit 174 to the called station #5 or by sending a "voice-hail" to the called station #5 from the audio subsystem 37 via lead 206 and lead 204 to the line select matrix unit 174 and then over the selected audio lead from the line select matrix unit 174. Lead 206 is connected to the input of first amplifier 38 and lead 44 in the audio subsystem 37. The party at the calling station #4 gives the "voice-hail" by speaking into the speaker/microphone 42 while operating the second switch means 50 (push-to-talk switch).

The terminal 150 at the called station #5, upon the receipt of the control data or information word (digital control or address information), routes the control data or information word (digital control or address information) to the control de-mux unit 208 via lead 210. The output of the control de-mux unit 208 is routed to the control unit for line select matrix 166 via eleventh connecting means 212. One output (the line select enable signal) of the control unit for line select matrix 166 is routed to the line select matrix unit 174 via third connecting means 176 where the line select matrix unit 174 is caused to select the proper audio lead from the audio leads 154–160 and route the audio to the audio subsystem 37 via leads 204 and 206. The other output of the control unit for line select matrix 166 provides the "slave enable" condition via lead 112 to configure the audio subsystem 37 of the called station #5 as a slave.

The party at the called station #5, thus being alerted that another station is calling, need not take any action other than to verbally answer the call in a "hands off" condition while carrying on a normal conversation with the calling party. At the calling station (#4), the calling party will talk or listen as dictated by the position of second switch means 50 as previously disclosed in the discussion of the first embodiment.

At the conclusion of the communication between the parties at the calling station #4 and the called station #5, the party at the calling station #4 places the previously selected line select switch in the line select switch unit 164 to the off or non-select position and then momentarily closes the send/clear switch 194. The closing of the send/clear switch 194 causes the control de-mux unit 208 at the called station #5 to cease sending its output to the control unit for line select matrix 166 resulting in the line select matrix unit 174 to unlatch and disconnect the previously selected audio lead from the audio leads 154–160 and return the audio circuits of the terminals to a standby condition.

The fifteen station network can exchange simultaneous conversations between eight terminals with privacy. Other stations or terminals may monitor or join in ongoing conversations simply by selecting the appropriate "busy" line at the line select switch unit 164.

Figure 11:
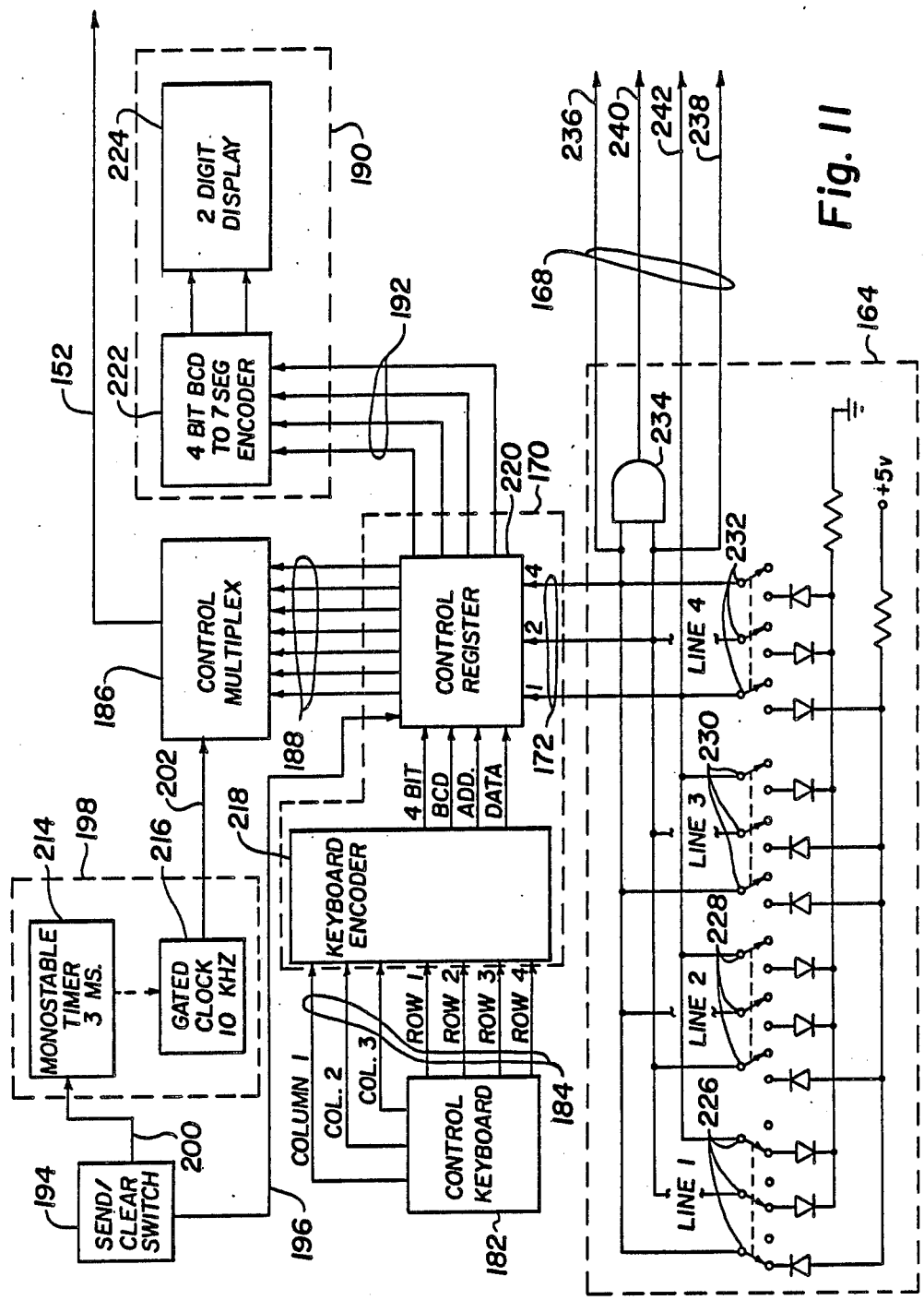
FIG. 11 is a simplified block diagram of selected portions of the third embodiment of the present invention.

In looking at the various operations at the calling station #4, FIG. 11 illustrates in detail the circuit construction of the preferred embodiment of the clock unit 198, the keyboard encoder and control register 170, the address encoder and display 190 and the line select switch unit 164. Clock unit 198 comprises monostable timer 214 operatively coupled to gated clock 216. Keyboard encoder and control register 170 comprises keyboard encoder 218 operatively coupled to control register 220. Address encoder and display 190 comprises a four-bit BCD to seven segment encoder 222 operatively coupled to a two-digit display 224. Line select switch unit 164 comprises sixth through ninth switch means 226–232, respectively and AND gate 234. A ten switch keyboard in the control keyboard 182 is employed to input a two-bit address (desired station) to the keyboard encoder 218 which converts the two-bit address to four-bit BCD address data (desired station) which is supplied to the control register 220. The four-bit BCD address data is stored in the control register 220 and then combined with the line select data sent from the line select switch unit 164 which employs three-bit BCD data. The control register 220 holds this seven-bit BCD control data or information word and routes the four-bit BCD address data to dual four-bit to seven-segment, digital-display decoder/drivers in the encoder 222. The decoder/drivers provide seven-segment data to two single-digit LED displays in the two-digit display 224.

Momentary closure of the send/clear switch 194 sends an appropriate signal (via eighth connecting means 196) to control register 220 effecting a parallel transfer of the seven-bit station address data and the line select data from the control register 220 to the control multiplex 186. The momentary closure of the send/clear switch 194 also causes the monostable timer 214 to output a 3 millisecond pulse to gated clock 216 thereby enabling the gated clock 216 which provides an output signal (via tenth connecting means 202) to control multiplex 186 thereby allowing the control multiplex 186 (eight-bit shift register) to shift the seven-bit station address data and the line select data out of the eight-bit shift register serially, three times, to the called terminal or station #5 via lead 152. Also, the line select enable signals are provided via first connecting means 168 to the control unit for line select matrix 166 (see FIG. 12). First connecting means 168 comprises leads 236–242. Sixth switch means 226, in the line select switch unit 164, is shown in the on position to select lead 154 to carry the audio signals between the calling station #4 and the called station #5. A "1" signal or bit is input on lead 236 while a "0" signal or bit is input on leads 238–242.

Figure 12:
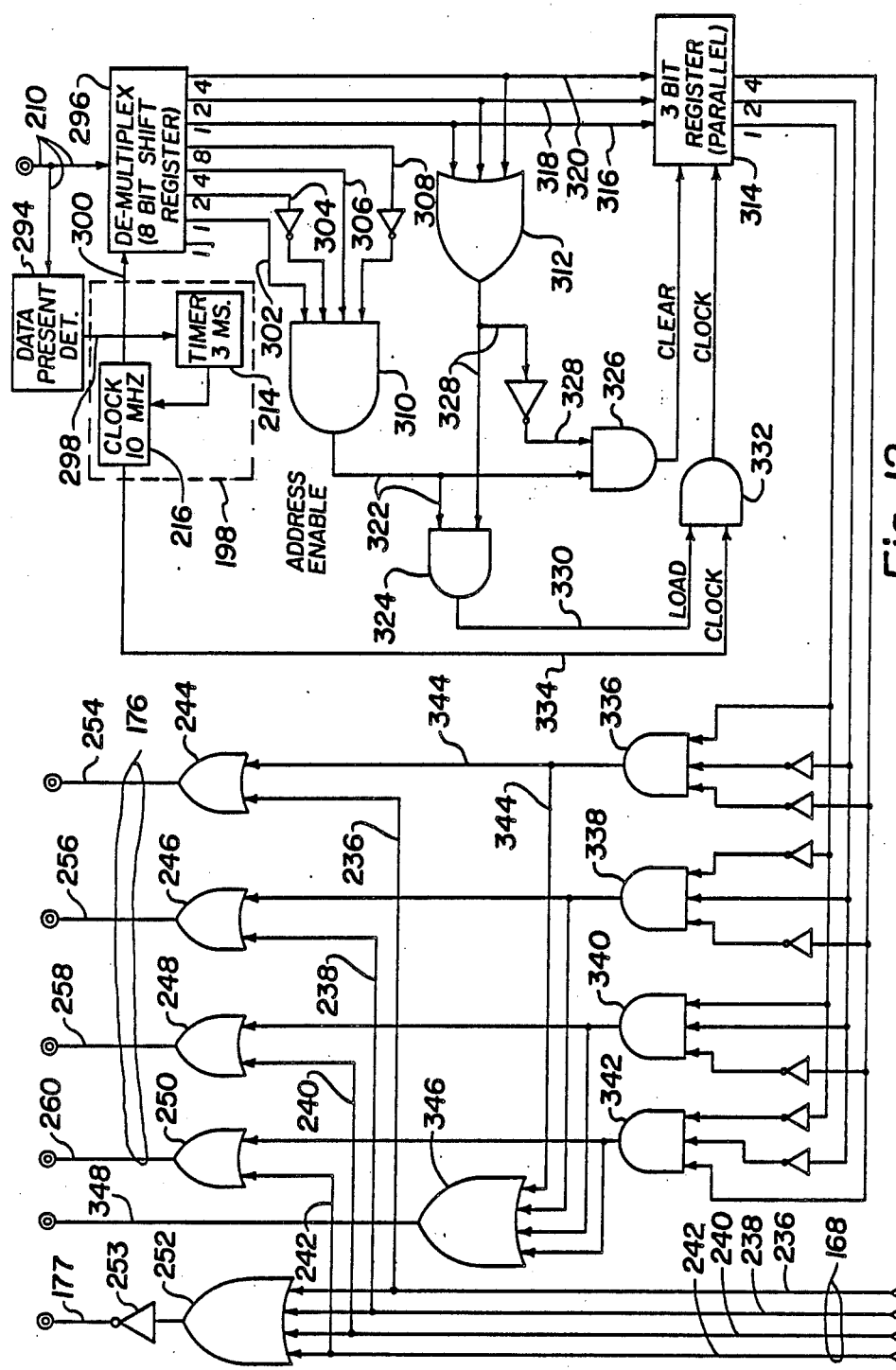
FIG. 12 is a simplified schematic circuit diagram of the control unit for line select matrix of the present invention.

FIG. 12 illustrates in detail the circuit construction of the preferred embodiment of the control unit for line select matrix 166 and the control de-mux unit 208. At the calling station #4, the line select enable signals from the line select switch unit 164 are received, via first connecting means 168, and are routed to first OR gate 244 through fifth OR gate 252, respectively. The outputs of first OR gate 244 through fourth OR gate 250 are routed to the line select matrix unit 174 via third connecting means 176 which comprises leads 254–260. With the "1" signal or bit being input on lead 236, first OR gate 244 will provide a "1" signal or bit on lead 254 of third connecting means 176. The output of fifth OR gate 252 is input to inverter 253 whose output is provided, via lead 177 and lead 122, to audio subsystem 37 to enable first amplifier 38. The remaining portion of FIG. 12 will be covered later when discussing the operation of the control unit for line select matrix 166 at the called station #5.

Figure 13:
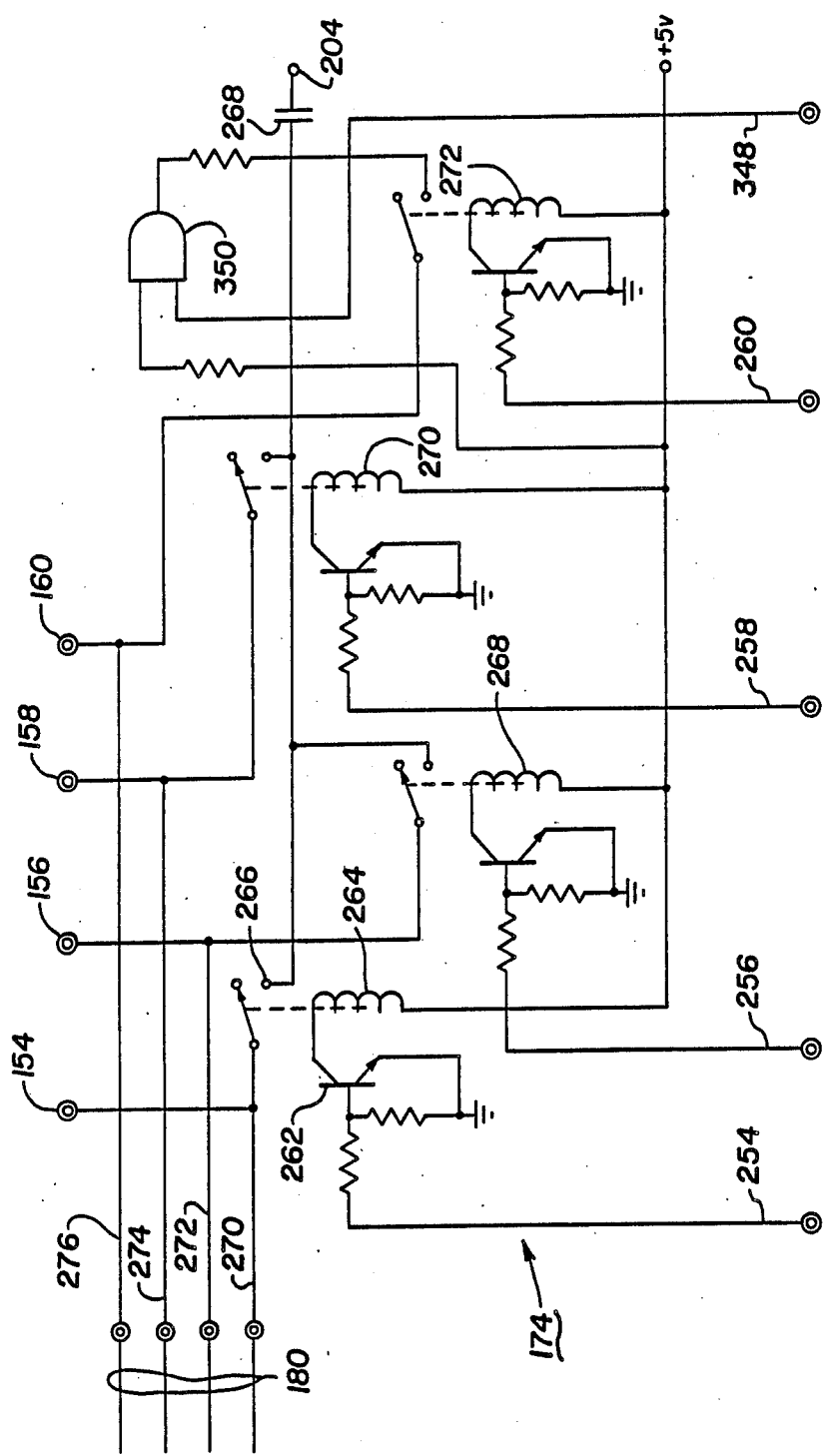
FIG. 13 is a simplified schematic circuit diagram of the line select matrix of the present invention.

FIG. 13 illustrates in detail the circuit construction of the preferred embodiment of the line select matrix unit 174. At the calling station #4, the "1" signal or bit is input on lead 254 from the control unit for line select matrix 166 (since sixth switch means 226 was placed in the on position in the line select switch unit 164) and is input to transistor 262 whose conduction activates relay 264 to close relay contacts 266 and connect audio lead 154 to lead 204 through capacitor 268. Lead 204 is operatively coupled to lead 206 and then to the audio subsystem 37 thereby routing the audio from the audio subsystem 37 to audio lead 154 of the inter-station trunk line. Relays 268–272 provide the means to connect the other audio leads of the inter-station trunk line to the audio subsystem 37 when those audio leads are selected for use by the appropriate switch means in the line select switch unit 164. The status of the audio leads 154–160 is sent to the line status display 178 via fourth connecting means 180 comprising leads 270–276.

Figure 14:
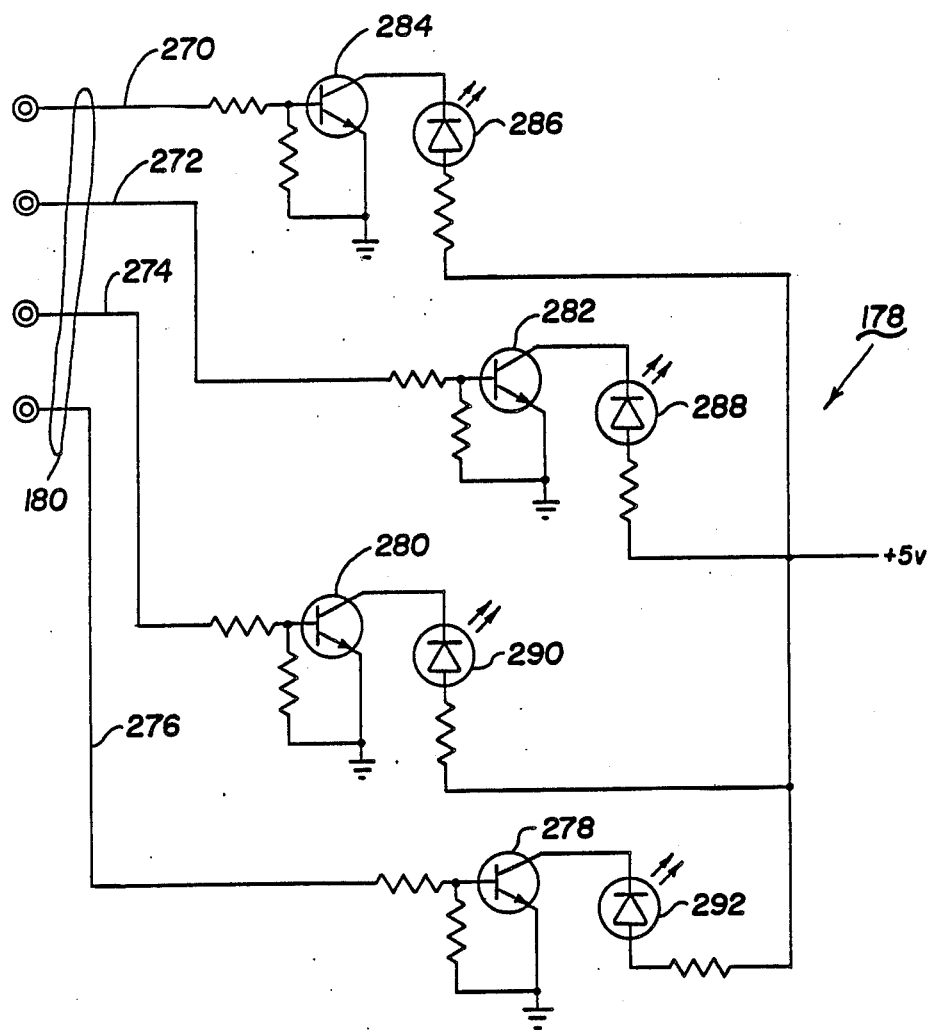
FIG. 14 is a simplified schematic circuit diagram of the line status display.

At the calling station #4, FIG. 14 illustrates in detail the circuit construction of the preferred embodiment of the line status display 178. When any of the audio leads or lines 154–160 are accessed by a calling station (e.g. #4), a TTL level one signal is applied to the accessed audio lead and applied to the line status display 178 via fourth connecting means 180. The TTL level one signal is input to one of the high impedance input LED (light emitting diodes) drivers 278–284 and associated LEDs 286–292 which are labeled to indicate the correct audio lead number.

At the called station #5 and with reference to FIG. 12, the control de-mux unit 208 receives the control data or information word (the seven-bit station address data and the line select data) via lead 152 and lead 210. The control data or information word is provided via lead 210 to the data present detector 294 and the eight-bit shift register in the de-multiplex unit 296. The data present detector 294 provides an output via lead 298 to the monostable timer 214 of the clock unit 198 causing the monostable timer 214 to output a three millisecond pulse to gated clock 216 which causes the gated clock 216 to start and run. The output of the gated clock 216 is output on lead 300 to the eight-bit shift register in the de-multiplex unit 296 causing the eight-bit shift register to output, in parallel, a four-bit BCD address word on leads 302–308 to AND gate 310 (equipped with inverters at appropriate input leads to establish a discrete BCD address recognizable to AND gate 310) and a three-bit BCD line select word to NOR gate 312 and three-bit register 314 via leads 316–320.

The address enable output signal of AND gate 310 is provided via lead 322 as one input to AND gate 324 and to AND gate 326. The output of NOR gate 312 is provided as the other input, via lead 328, to AND gate 324 and AND gate 326. The output of AND gate 324 is provided as one input, via lead 330, to AND gate 332 while the other input to AND gate 332 is provided, via lead 334, as a clock pulse train from gated clock 216. The outputs of AND gates 326 and 332 are provided as inputs to three-bit register 314. The output of AND gate 332 to three-bit register 314 comprises clock pulses.

The three-bit register 314 is loaded with the three-bit BCD line select word and when clocked, by the output of AND gate 332, holds (latched) and also transfers the three-bit BCD line select word to the inputs of AND gates 336–342 which are equipped at their inputs with inverters which provide decoding of the three-bit BCD line select word to cause a "1" signal or bit at the output of one of the AND gates 336–342. In our particular example, the "1" signal or bit would be output from AND gate 336 on lead 344 since sixth switch means 226 had been placed in the on or activate position at the calling station #4.

The "1" signal or bit on lead 344 is input to OR gate 346 whose output is the slave enable signal which is output on lead 348 to lead 112 of the audio subsystem 37 at the called station #5 to place the terminal 150 in the slave condition. The output of OR gate 346 is also output to AND gate 350 (see FIG. 13). The "1" signal or bit on lead 344 is also input to OR gate 244 which results in a "1" signal or bit being output on lead 254.

At the called station #5 and with reference to FIG. 13, the "1" signal or bit received on lead 254 from the control unit for line select matrix 166 is input to transistor 262 whose conduction activates relay 264 to close relay contacts 266 and connect audio lead 154 to lead 204 through capacitor 268. Lead 204 is operatively coupled to lead 206 and then to the audio subsystem 37 (in the called station #5) thereby routing the audio from the audio lead 154 of the inter-station trunk line to the audio subsystem 37. The output of OR gate 346 received on lead 348 in the line select matrix unit 174 is provided as an input to AND gate 350 and results in AND gate 350 providing a "1" signal or bit output to the line status display 178 via lead 270 where the output is received by high impedance input LED driver 284 which results in LED 286 being activated to show that audio lead 154 is now busy.

The called terminal #5 has now been interconnected to the calling terminal #4 via a discretely addressed line selection and has been configured for slave operation so communications by the called terminal #5 to the calling terminal #4 can be carried out in a "hands off" condition.

When communications are concluded, the party at the calling station #4 returns sixth switch means 226, in the line select switch unit 164, to the "reset" or "off" (no audio lead or line selected) and momentarily depresses the send/clear switch 194. The output from the send/clear switch 194 to the control register 220 causes the control register 220 to output to the control multiplex 186, a seven-bit station address data and the line select data, where the four-bit BCD address word would be that of the called station #5 but the three-bit BCD line select word portion would be coded as "all zeros". Upon receipt of that data at the called station #5, the output of OR gate 312 would be a "0" signal or bit which would provide a "1" signal or bit to AND gate 326. With two "1" signals or bits input to AND gate 326, AND gate 326 would output a "1" signal or bit (a clear signal) to the three-bit register 314 which would then output "all zeros" to AND gates 336–342 with the result that relay 264 would "drop out" and disconnect audio line 154 from terminal 150 at the called station #5.

If a party at a station other than the calling station #4 and the called station #5 wishes to monitor the conversation on a busy audio lead (one of audio leads 154–160), the listening party will place the appropriate line select switch 226–232 to the "on" position. The output from the line select switch unit 164 will be sent, via first connecting means 168 to the control unit for line select matrix 166 where the output from fifth OR gate 252 will enable first amplifier 38 of the audio subsystem 37 at the terminal of the listening party. The input from the line select switch unit 164 will be input to OR gates 244–250 resulting in an output from the appropriate OR gate to the appropriate relay of relays 264–272 which will result in the connection of lead 204 (for audio) to the audio lead of audio leads 154–160 which is presently being used.

Although the present invention has been described in conjunction with specific forms thereof, it is evident that many alternatives, modifications and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiment. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined in the appended claims.

It is claimed:

1. An intercommunications system for the selective establishment of two-way communications between a multiplicity of stations, said intercommunications system comprising:
   a terminal located at each of said stations, each terminal being capable of being configured to operate in a mode for calling other terminals, each terminal also being capable of being configured to operate in a mode for being called by other terminals and operate in a "hands off" mode;
   a communications network comprising a predetermined number of lines for interconnecting any one of said terminals to at least one other of said terminals;
   each of said terminals comprising:
      an audio subsystem operatively coupled to said communications network, said audio subsystem including squelch means capable of disabling a predetermined portion of said audio subsystem, said audio subsystem further including slave enable means capable of configuring said terminal to a slave condition such that communications may be carried on in a "hands off" mode at the called terminal;
      means for generating coded address information to be transmitted to all terminals over said communications network, said coded address information being a digital signal which is capable of being coded to be recognized by a particular one of said terminals and capable of causing the particular one of said terminals to be configured for a "hands off" mode of operation;
      means for decoding said coded address information when received over said communications network and providing address signals after decoding said received coded address information at the terminal being addressed;
      logic means operatively connected to said audio subsystem, said means for decoding and said means for generating coded address information, said logic means being structured to provide an operative signal to said squelch means upon receipt of an output signal from said means for generating coded address information, said logic means further being structured to provide an operative signal to said slave enable means upon receipt of an output signal from said means for decoding.

2. The intercommunications system of claim 1 further including tone generator means operatively coupled to said communications network, said tone generator means being structured to provide a distinct audio tone burst from one terminal to another terminal after the audio subsystem in said another terminal has been configured to the "hands off" mode of operation.

3. The intercommunications system of claim 1 further including monitor enable means operatively coupled to said logic means, said monitor enable means being structured to provide a signal to said logic means to cause said logic means to disable said squelch means such that the audio signals on said communications network may be monitored.

4. The intercommunications system of claim 1 wherein one of said predetermined number of lines in said communications network is dedicated to the transmission of said coded address information among the terminals and two different ones of said predetermined number of lines are dedicated to the transmission of audio signals among the terminals.

5. The intercommunications system of claim 1 further including line status means to indicate if an audio line in the communications network is busy and which terminals are communicating, said line status means being operatively coupled to said means for decoding said coded address information.

6. The intercommunications system of claim 1 wherein said audio subsystem includes first amplifier means operatively coupled to said communications network, said first amplifier means being operatively coupled to said squelch means such that said squelch means is capable of disabling said first amplifier.

7. An intercommunications system for the selective establishment of two-way communications between a multiplicity of stations, said intercommunications system comprising:
   a terminal located at each of said stations, each terminal being capable of being configured to operate in a mode for calling other terminals, each terminal also being capable of being configured to operate in a mode for being called by other terminals and operate in a "hands off" mode;
   a communications network comprising a predetermined number of lines for interconnecting any one of said terminals to at least one other of said terminals;
   each of said terminals comprising:
      an audio subsystem operatively coupled to said communications network, said audio subsystem including squelch means capable of disabling a predetermined portion of said audio subsystem, said audio subsystem further including slave enable means capable of configuring said terminal to a slave condition such that communications may be carried on in a "hands off" mode;
      means for generating address data for selecting a particular terminal to be called;
      means for generating line select data for selecting a particular line in said communications network to be used for the transmission of audio signals in the two-way communications;
      encoder and register means operatively connected to receive said address data and said line select data and combine same into a control data word;
      means for transmitting said control data word over a designated line in said predetermined number of lines in said communications network to all terminals;
      line select means operatively configured for connecting the terminal to the particular line in said communications network which was selected to be used for the transmission of audio signals in the two-way communications;
      control means operatively connected between said means for generating line select data and said line select means, said control means being structured to decode said line select data and provide said line select means with the correct enable signal causing said line select means to connect the terminal to the particular line which was selected; and decoder means operatively connected to said designated line in said communications network and to said control means, said decoder means structured to decode said control data word and provide said line select data to said control means.

8. The intercommunications system of claim 7 further including tone generator means operatively coupled to said communications network, said tone generator means being structured to provide a distinct audio tone burst from one terminal to another terminal after the audio subsystem in said another terminal has been configured to the "hands off" mode of operation.

9. The intercommunications system of claim 7 wherein said control means includes monitor enable means operatively coupled to said audio subsystem, said monitor enable means being structured to provide a signal to said squelch means to disable said squelch means such that the audio signals on said communications network may be monitored.

10. The intercommunications system of claim 7 further including a line status device structured to indicate which lines in the communications network are being used for communications.

11. The intercommunications system of claim 7 further including an address data display structured to indicate which terminals are being used for communications.

12. The intercommunications system of claim 7 wherein said multiplicity of stations comprises up to fifteen stations.

13. The intercommunications system of claim 7 wherein said predetermined number of lines in said communication network comprises five lines.

14. The intercommunications system of claim 7 wherein said means for generating line select data comprises a predetermined number of switch means for providing a three bit line selection code to said encoder and register means and a four bit line selection code to said control means.

15. The intercommunications system of claim 7 wherein said control means comprises first gating means operatively configured to receive said line select data from said means for generating line select data and to provide a first operative signal to said line select means to cause said line select means to operatively connect said audio subsystem of said terminal to the selected line.

16. The intercommunications system of claim 15 wherein said control means further comprises second gating means operatively configured to receive said line select data from said means for generating line select data and provide a second operative signal to said audio subsystem to control said squelch means.

17. The intercommunications system of claim 15 wherein said decoder means comprises a de-multiplex register operatively coupled to said dedicated line to receive said control data word transmitted from a calling terminal and further comprising a three-bit register operatively coupled between said de-multiplex register and said control means to provide said line select data to said control means.

18. The intercommunications system of claim 17 wherein said control means comprises third gating means operatively configured to receive line select data from said decoder means and provide a third operative signal to said first gating means, whereby said first gating means upon receipt of said third operative signal does provide a first operative signal to said line select means to cause said line select means to operatively connect said audio subsystem of said terminal to the selected line.

19. The intercommunications system of claim 18 wherein said control means comprises fourth gating means operatively configured to receive said third operative signal from said third gating means and provide a fourth operative signal to said audio subsystem to control said slave enable means.

20. The intercommunications system of claim 7 further including line status means operatively coupled to said line select means to indicate which of the lines in the predetermined number of lines are busy and being used for transmission of audio signals.

* * * * *